United States Patent
Gaya

(10) Patent No.: US 7,257,716 B2
(45) Date of Patent: Aug. 14, 2007

(54) METHOD AND APPARATUS FOR UPLOADING MASS-DISTRIBUTED CONTENT TO A SERVER

(75) Inventor: Bruce Gaya, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 829 days.

(21) Appl. No.: 10/228,712

(22) Filed: Aug. 27, 2002

(65) Prior Publication Data

US 2004/0044899 A1    Mar. 4, 2004

(51) Int. Cl.
*H04L 9/00* (2006.01)
*G06F 15/16* (2006.01)

(52) U.S. Cl. .................. 713/193; 709/200; 713/181; 713/189

(58) Field of Classification Search ............... 713/193, 713/183, 191, 181; 709/200
See application file for complete search history.

(56) References Cited

U.S. PATENT DOCUMENTS 5,727,156 A * 3/1998 Herr-Hoyman et al. ..... 709/219
6,339,824 B1 * 1/2002 Smith et al. ................. 713/157
2002/0091928 A1 * 7/2002 Bouchard et al. ........... 713/178
2002/0138744 A1 * 9/2002 Schleicher et al. ......... 713/187

FOREIGN PATENT DOCUMENTS

EP         1329789 A1 *   7/2003

* cited by examiner

*Primary Examiner*—Nasser Moazzami
*Assistant Examiner*—Fikremariam Yalew
(74) *Attorney, Agent, or Firm*—Park, Vaughan & Fleming LLP

(57) ABSTRACT

One embodiment of the present invention provides a system that facilitates uploading content from a client to a server. Upon receiving content, the client divides the content into smaller data-blocks of a predetermined size. Once the content has been divided, the client computes a codeword for each data-bock. Next, the client computes a composite codeword for the set of codewords by computing a function of the set of codewords. The client also computes a content identifier for the content to differentiate the content from other content. Once this is done, the client sends the composite codeword and the content identifier to the server, and receives a response from the server indicating whether or not the content is present on the server. If the content is not present on the server, the client sends the content to the server.

37 Claims, 3 Drawing Sheets

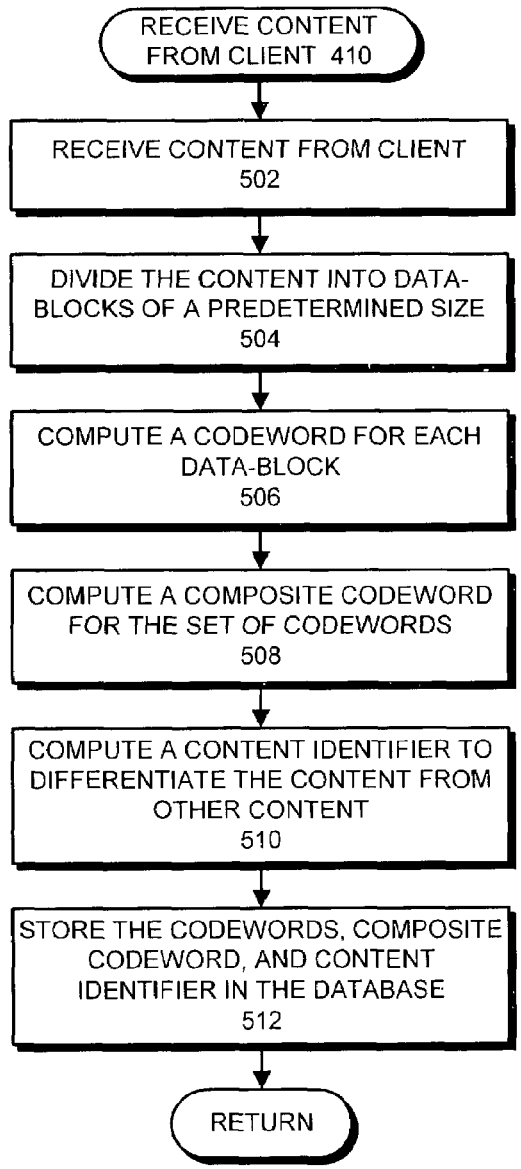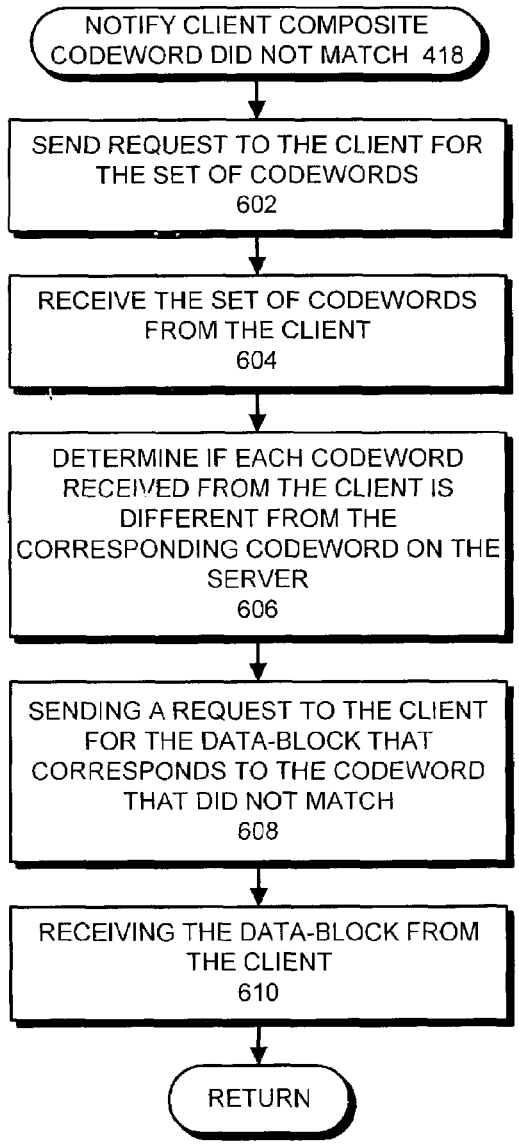
FIG. 5
FIG. 6

METHOD AND APPARATUS FOR UPLOADING MASS-DISTRIBUTED CONTENT TO A SERVER

BACKGROUND

1. Field of the Invention

The present invention relates to computer networks. More specifically, the present invention relates to a method and an apparatus for facilitating the process of uploading mass-distributed content to a server.

2. Related Art

The digital media revolution has been fueled in part by the wide availability and ever decreasing costs of CDs and DVDs. The number of different media titles available is growing steadily, and will continue to do so in the foreseeable future. This fact, along with the increasing popularity of broadband connections, has resulted in numerous copies of the same media being uploaded to numerous locations on the Internet as well as many corporate and private networks.

There are a number of good reasons for uploading media content. Some consumers archive media titles to networked machines for backup purposes. IT technicians upload complete copies of media titles so they will be available on demand to any node on the network. While the systems and resources of today are adequate for handling these tasks, the time to upload the content can be enormous.

Typical CDs can contain up to 800 megabytes of data, and typical DVDs can contain over 4.7 gigabytes. Broadband connections typically provide bandwidth in the 1.5 megabit per second range. Hence, even assuming ideal conditions, an upload can still take hours to complete.

Providing adequate storage space on the systems that store these uploads is another problem. In some cases, precious storage space is wasted in storing numerous copies of identical content.

What is needed is a method and an apparatus that can upload content to a server in a quick and efficient manner while minimizing the problems listed above.

SUMMARY

One embodiment of the present invention provides a system that facilitates uploading content from a client to a server. Upon receiving content, the client divides the content into smaller data-blocks of a predetermined size. Once the content has been divided, the client computes a codeword for each data-bock. Next, the client computes a composite codeword for the set of codewords by computing a function of the set of codewords. The client also computes a content identifier for the content to differentiate the content from other content. Once this is done, the client sends the composite codeword and the content identifier to the server, and receives a response from the server indicating whether or not the content is present on the server. If the content is not present on the server, the client sends the content to the server.

In a variation of this embodiment, the client receives a request to send one or more of the data-blocks to the server, and in response, the client sends one or more of the data-blocks to the server.

In a variation of this embodiment, the client receives a notification from the server that the codeword did not match the codeword stored on the server for the data-block. Upon receiving this notification, the client divides the data-block into smaller data-blocks of a smaller predetermined size and computes a new codeword for each smaller data-block. In response to a request from the server, the client sends the new codewords to the server. Finally, the client receives a request from the server for one or more smaller data-blocks, and in response to the request, sends one or more of the smaller data-blocks.

In a variation of this embodiment, the client uses a hash function to compute the codewords and the composite codeword.

In a variation of this embodiment, the client sends an account identifier to the server to facilitate identification of the client.

In a variation of this embodiment, the client pads the content with zeros to facilitate dividing the content into data-blocks of the predetermined size.

In a variation on this embodiment, prior to uploading the content, the client saves the content in an alternate format that requires less physical space than the original version of the content.

One embodiment of the present invention provides a system that facilitates uploading content from a client to a server. The server starts by receiving a composite codeword and a content identifier for content that the client wishes to upload. Next, the server determines if the content already exists on the server by checking if the content identifier exists in a database of content identifiers. If the content exists on the server, the server determines if the composite codeword matches a stored composite codeword for the content. If so, the server notifies the client that the content is present on the server.

In a variation of this embodiment, if the content is not present on the server, the server notifies the client that the content is not present on the server. In response to this notification, the server receives the content from the client. Once the content has been received, the server divides the content into data-blocks of a predetermined size and computes a codeword for each data-block. Next, the server computes the composite codeword for the set of codewords by computing a function of the set of codewords. Finally, the server computes the content identifier for the content to differentiate the content from other content, and then stores the codewords, the composite codeword, and the content identifier in the database.

In a further variation of this embodiment, the server uses a hash function to compute the codewords and the composite codeword.

In a variation of this embodiment, the server receives an account identifier from the client to facilitate identification of the client.

In a further variation of this embodiment, the server uses the codewords and the composite codeword to determine what portions of the content the server has.

In a variation of this embodiment, if the composite codeword does not match the stored composite codeword, the server sends a request to the client for the set of codewords and then receives the set of codewords from the client. Next, the server determines if each codeword received from the client is different from the corresponding codeword stored on the server. If a data-block's corresponding codeword did not match the codeword stored on the server, the server sends a request to the client for the client to send the data-block to the server. In response to the request, the server receives the requested data-block from the client.

In a further variation of this embodiment, for each data-block whose corresponding codeword from the client did not match the codeword stored on the server, the server sends a request to the client asking the client to send the data-block to the server. In response to the request, the server receives the data-blocks from the client.

In a further variation of this embodiment, if the codeword for the data-block does not match the corresponding codeword stored on the server, the server notifies the client that the codeword did not match the stored codeword for the data-block. The server also divides the data-block into smaller data-blocks of a predetermined size and computes a new codeword for each smaller data-block. Next, the server sends a request to the client for the set of new codewords. In response to the request, the server receives the set of new codewords from the client and determines if each new codeword received from the client is different from the corresponding new codeword stored on the server. If a new codeword does not match, the system sends a request to the client for the smaller data-block that corresponds to the new codeword, and in response to the request, receives the smaller data-block from the client.

BRIEF DESCRIPTION OF THE FIGURES

FIG. 5 illustrates the process of receiving the content from the client in accordance with an embodiment of the present invention.

FIG. 6 illustrates the process of receiving portions of the content in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
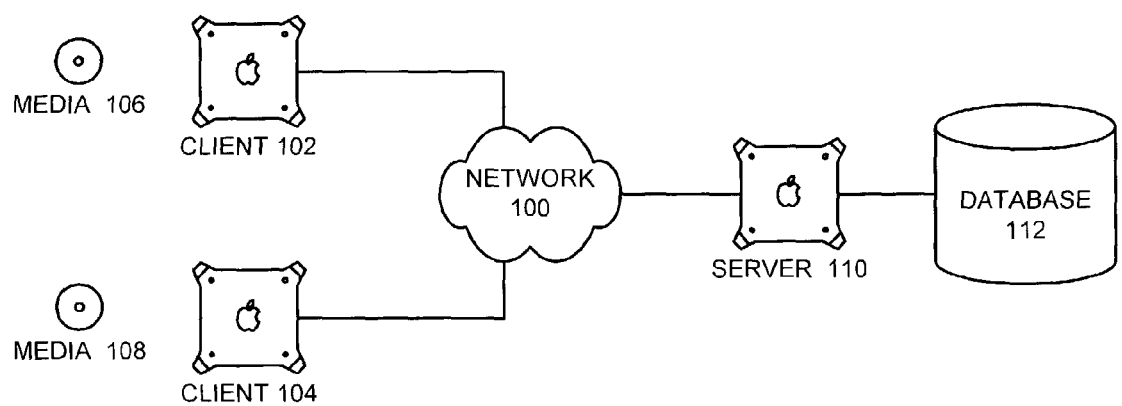
FIG. 1 illustrates a computer network in accordance with an embodiment of the present invention.

FIG. 1 illustrates a computer network in accordance with an embodiment of the present invention. FIG. 1 contains client 102 and client 104 which are connected to network 100. Clients 102 and 104 can generally include any node on a network including computational capability and including a mechanism for communicating across the network. Network 100 can generally include any type of wire or wireless communication channel capable of coupling together computing nodes. This includes, but is not limited to, a local area network, a wide area network, or a combination of networks. In one embodiment of the present invention, network 100 includes the Internet.

Client 102 includes media 106 and client 104 includes media 108. Media 106 and media 108 can include any type of digital medium including, floppy disks, CDs and DVDs.

Server 110 is connected to network 100. Server 110 can generally include any computational node including a mechanism for servicing requests from a client for computational and/or data storage resources. Server 110 is additionally connected to database 112. Database 112 can include any type of system for storing data in non-volatile storage. This includes, but is not limited to, systems based upon magnetic, optical, and magneto-optical storage devices, as well as storage devices based on flash memory and/or battery-backed up memory.

Upload Control Process

Figure 2:
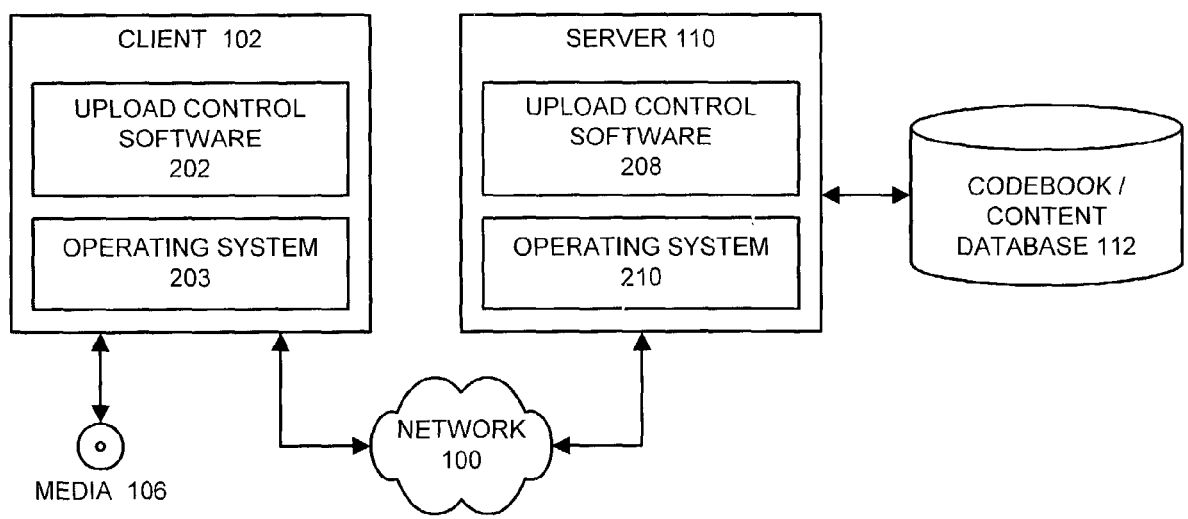
FIG. 2 illustrates the upload control process in accordance with an embodiment of the present invention.

FIG. 2 illustrates the upload control process in accordance with an embodiment of the present invention. FIG. 2 includes client 102 and server 110, which are coupled together through network 100. Client 102 contains upload control software 202 and operating system 203. Server 110 contains upload control software 208 and operating system 210. Additionally, upload control software 208 is connected to database 112. When client 102 is started, upload control software 202 and upload control software 208 negotiate respective communication protocols, hash functions, and methods used for content uploading.

Upload control software 202 reads media 106. The content on media 106 is padded with zeros until it is a multiple of a fixed size, then divided into equal data-blocks of the fixed size. The fixed size, called the data-block size, must be the same as that used by upload control software 208. One embodiment provides a data-block size that is 4 megabytes. Upload control software 202 then computes a codeword for each data-block using a hash function. The hash function must be the same as that used by upload control software 208 and must provide a means for distinguishing a particular data-block from other data-blocks to be uploaded to the server 110. In one embodiment, the hash function is the National Institute of Standards and Technology's Secure Hash Algorithm One (SHA1). In this embodiment, a composite codeword is computed using the following function:

```
composite codeword =
    hash( first data-block index, last data-block index,
        codeword( first data-block ),
        codeword( second data-block ),
        codeword( third data-block ),
        . . . ,
    codeword( last data-block ) )
```

In the initial upload case, the first data-block index is one and the last data-block index is the number of data-blocks. The indexes are prepended to a list containing entries for each data-block codeword and the same hash function that was used to compute the data-block codewords can then be used to compute the composite codeword.

Upload control software 208 then computes a storage media content identifier that to a reasonable probability distinguishes the media 106's content from other storage media's content. For an audio CD, a storage media content identifier can be constructed by taking the hash of the number of tracks on the CD and the starting time and duration of each track contained on the CD's header track. The starting time and duration may be rounded to account for copy-to-copy variations in these values. The construction of storage media content identifiers for other types of media is known to those skilled in the art.

Upload control software 202 then sends the composite codeword, the storage media's content identifier, and an account identifier to server 110. The account identifier is used by upload control software 208 to distinguish client 102 from other clients. Construction and use of such an account identifier is well known to those skilled in the art. Upload control software 208 now queries its combined codebook and content database 112 for information related to the received storage media's content identifier. Since content database 112 is empty, the query does not retrieve any information. Upload control software 208 then sends a message back to client 102 indicating that the received storage media's content identifier is unknown to database 112.

Upload control software 202 then sends the storage media's content to server 110 in its entirety. Upon receipt of the storage media's content, upload control software 208 divides it into equal data-blocks of the same fixed size known to upload control software 202. A codeword for each data-block is then computed using the agreed upon hash function. Upload control software 208 now generates a storage media content identifier using the same method used by upload control software 202, and generates an upload instance identifier. The upload instance identifier uniquely identifies this upload from any other upload processed or to be processed by upload control software 208. Generating the upload instance identifier may be as simple as incrementing a persistent upload counter. Generation of such an upload instance identifier is well known to those skilled in the art.

The received account identifier, generated media content identifier, generated upload instance identifier, and each storage media content data-block are now stored in the combined codebook and content database 112 so that, at a later time:

A. a given account identifier will retrieve all storage media identifiers used during previous uploads with the given account identifier;

B. a given account identifier and a given storage media identifier will retrieve all the upload instance identifiers used during previous uploads with the given account identifier and storage media identifier;

C. a given account identifier, a given storage media identifier, and a given upload instance identifier will retrieve all the data-blocks received during previous uploads with the given upload instance identifier, account identifier, and storage media identifier;

D. a given storage media identifier will retrieve all the upload instance identifiers for all previous uploads with the given storage media identifier;

E. a given storage media identifier and a given upload instance identifier will retrieve all the codewords for all previous uploads with the given storage media identifier and upload instance identifier; and F. a given storage media identifier, a given upload instance identifier, and a given codeword will retrieve the storage media content data-block with the given storage media identifier and upload instance identifier that produced the given codeword when the hash algorithm was applied.

Finally, a message is sent to client 102 to indicate the upload is complete.

The same or another network device may now upload an identical copy of the storage media. This process is accomplished as follows: Upload control software 202 reads media 106. The storage media's content is then padded with zeros and divided into data-blocks as described in the initial upload above. Upload control software 202 then computes the codeword for each data-block, the composite codeword, the storage media content identifier, and generates an account identifier as described in the initial upload above.

Upload control software 202 then sends the composite codeword, the storage media's content identifier, and an account identifier to server 110. Upon receiving the composite codeword, the storage media's content identifier, and an account identifier, upload control software 208 first generates an upload instance identifier using the method described in the initial upload above, then queries its combined codebook and content database 112 for information related to the received storage media's content identifier. In this case, a list of upload instance identifiers is retrieved. For each upload instance identifier, upload control software 208 retrieves a list of codewords from its database 112 and constructs a composite codeword from the retrieved codewords using the method described in the initial upload section above.

Each instance's composite codeword is now compared against the received composite codeword. In this case, since the uploaded storage media's content is identical to the initial storage media's content, one of the generated composite codewords will be equal to the received codeword. Upload control software 208 now stores in the combined codebook and content database 112, the received account identifier, received media content identifier, generated upload instance identifier, and a database reference to the upload instance identifier and codewords whose composite codeword matched the received composite codeword.

After storage is complete, all the database retrieval operations described in the initial upload section are available. Storage of data in this way provides the opportunity for identical content available under two different account identifiers to be stored only once within the database. Finally, a message is sent to client 102 to indicate that the upload is complete. For a typical consumer Internet connection, the upload time is about equal to the time needed to read the storage media's content from media 106 and is minimally dependent on the speed of network 100.

Actual mass-distributed storage media may contain manufacturing defects or scratches that will cause two supposedly identical copies of the same storage media title to yield slightly different content when read. Also, in this invention, the storage media identifier only provides an approximate differentiation of storage media content. Two or more different items of content may have the same storage media identifier.

These cases are handled as follows. Upload control software 202 reads media 106. The storage media's content is then padded with zeros and divided into data-blocks as described in the initial upload above. Upload control software 202 then computes the codeword for each data-block, the composite codeword, the storage media content identifier, and generates an account identifier as described in the initial upload above.

Upload control software 202 then sends the composite codeword, the storage media's content identifier, and an account identifier to server 110. Upload control software 208 first generates an upload instance identifier using the method described in the initial upload above, then queries its combined codebook and content database 112 for information related to the received storage media's content identifier. In this case, a list of upload instance identifiers is retrieved. For each upload instance identifier, upload control software 208 retrieves a list of codewords from its database 112 and constructs a composite codeword from the retrieved codewords using the method in the initial upload above. Each instance's composite codeword is now compared against the received composite codeword.

In this case, due to manufacturing defects or scratches, or because the same storage media content identifier was used for a previous upload of a different storage media's content, no matching composite codewords are found. Upload control software 208 then sends a message to client 102 indicating that the received storage media content identifier was found, but the composite codeword was not found. Upload control software 202 now splits its list of storage media's content data-blocks that it used to generate the rejected composite codeword into two or more unique sub-lists, maintaining the data-block ordering.

The sub-lists should be constructed so that one or more of the sub-lists is likely to contain data variations and the other sub-lists are not. For instance, CD media is more likely to contain scratches near the outside of the disk so one sub list should contain the data-blocks corresponding to the outside of the disk. In addition, the data-blocks themselves may contain data, such as bursts of ones or zeros, indicative of data read errors. All these factors should be accounted for when spitting the storage media's content data-block list.

In the case where a rejected composite codeword was generated from a single data-block, the entire data-block is prepared for transmission to server 110. Otherwise, a composite code word is generated for each data-block sub-list using the method described in the initial upload above. Upload control software 202 now sends each composite codeword along with the numerical range of data-blocks that it used to generated the composite codeword, and each prepared single data-block along with its index in the storage media's content data-block list to server 110.

Upload control software 208 then examines the received message. For received data-blocks, a codeword is generated and the data-block and codeword is retained for later use. For each received composite codeword, upload control software 208 uses the previously received account identifier and media content identifier to retrieve all previous upload instance identifiers and their codewords, then uses the received composite codeword's associated data-block range to generate a composite codeword for retrieved data-blocks in the range. These codewords are then compared against the received composite codeword. If one codeword matches, the upload instance and codeword range are retained for later use.

If at least one received composite codeword could not be matched, upload control software 208 sends a message to upload control software 202 indicating which codeword or codewords of the previous message were not found. This process now repeats until upload control software 208 has accounted for all the storage media content data-blocks, having either a database reference or having a copy of each data-block. Upload control software 208 now stores a number of items in the combined codebook and content database 112, including the received account identifier, the received media content identifier, the generated upload instance identifier, and references to storage media content data-blocks or actual received data-blocks.

Preparing the Content for Uploading

Figure 3:
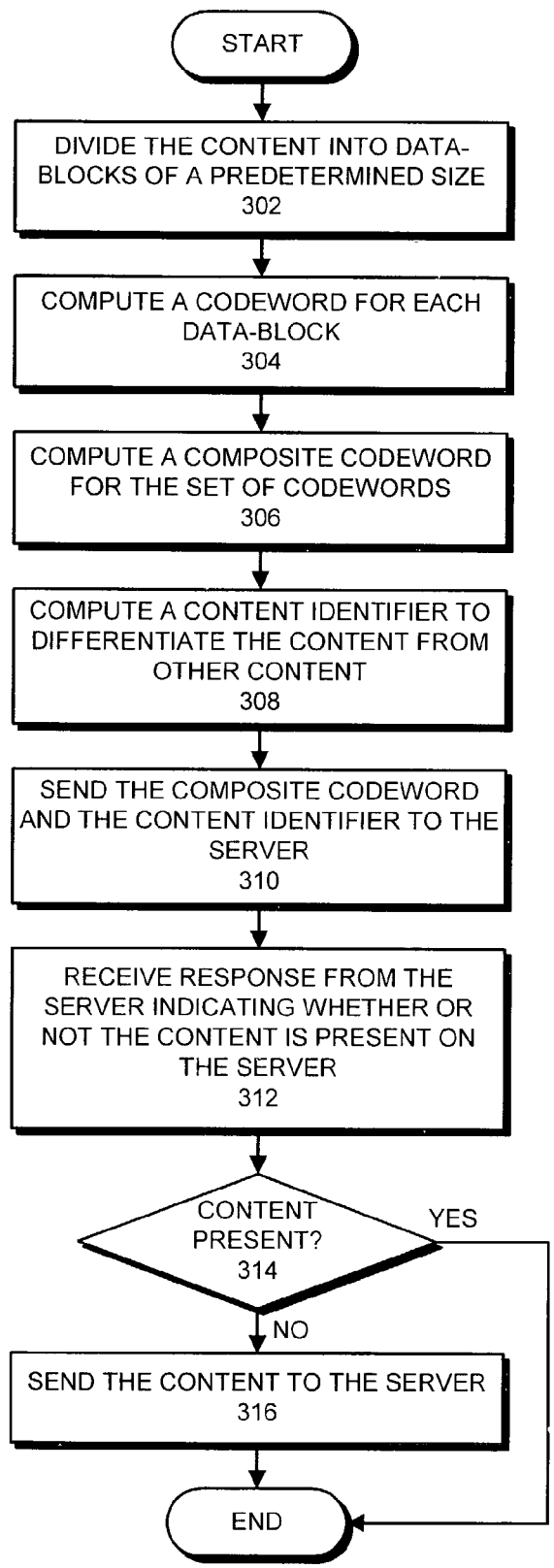
FIG. 3 illustrates the process of preparing the content for uploading in accordance with an embodiment of the present invention.

FIG. 3 illustrates the process of preparing the content for uploading in accordance with an embodiment of the present invention. Client 102 starts by dividing the content into data-blocks of a pre-determined size (step 302). Note that padding the content with zeros, or some other preparatory processing, may be necessary to produce equal-sized data-blocks. Next, client 102 computes a codeword for each data-block (step 304), and a composite codeword for the set of codewords (step 306). Client 102 also computes a content identifier to differentiate the content from other content (step 308). Once these have been computed, client 102 sends the composite codeword and the content identifier to server 110 (step 310).

Note that client 102 could also compute and send an account identifier to server 110 to facilitate identifying client 102 to server 110. Client receives a response from server 110 indicating whether the content is present on server 110 (step 312). If the content is not present, client 102 sends the content to server 110 (step 316).

Determining if an Upload is Necessary

Figure 4:
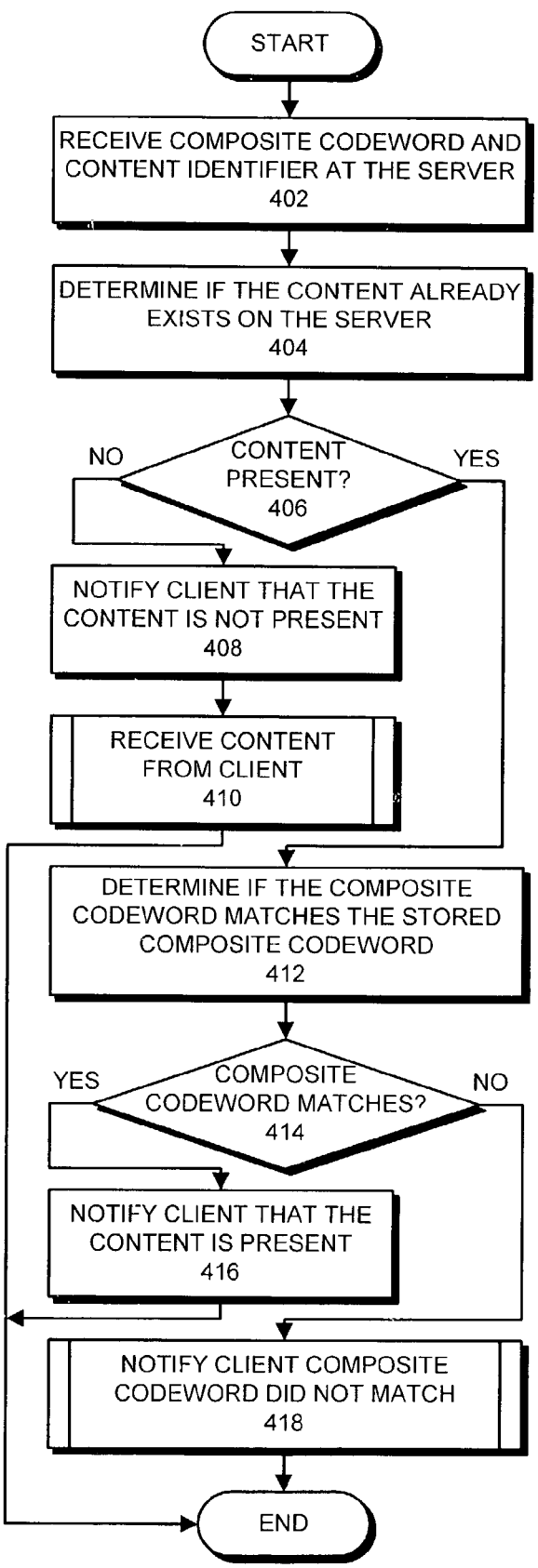
FIG. 4 illustrates the process of determining if an upload is necessary in accordance with an embodiment of the present invention.

FIG. 4 illustrates the process of determining if an upload is necessary in accordance with an embodiment of the present invention. Server 110 receives the composite codeword and content identifier from client 102 (step 402) and then determines if the content already exists on the server (step 404). If the content is not present, server 110 notifies client 102 (step 408) and receives the content from client 102 (step 410). If the content is present, server 110 determines if the composite codeword received from client 102 matches the corresponding codeword that it has in database 112 (step 412). If the codeword matches, server 110 notifies client 102 that the content is present (step 416). If the codeword does not match, server 110 notifies client 102 that the composite codeword did not match (step 418).

Receiving the Content from the Client

FIG. 5 illustrates the process of receiving the content from the client in accordance with an embodiment of the present invention. Server 110 receives the content from client 102 (step 502). Once the content has been received, server 110 divides the content into data-blocks of a predetermined size (step 504) and computes a codeword for each data-block (step 506). Next, server 110 computes a composite codeword for the set of codewords (step 508). Server 110 also computes a content identifier to differentiate the content from other content (step 510). Finally, server 110 stores the codewords, the composite codeword, and the content identifier in database 112 (step 512).

Receiving Portions of the Content

FIG. 6 illustrates the process of receiving portions of the content in accordance with an embodiment of the present invention. When the composite codeword does not match, it is important for server 110 to determine what portions of the content are different from that of client 102. First, server 110 sends a request to client 102 for the complete set of codewords for the content (step 602) and receives the codewords from client 102 (step 604). Next, server 110 determines which codewords received from client 102 are different from the codewords server 110 already has (step 606). When codewords that do not match have been found, server 110 sends a request to client 102 for the data-block that corresponds to the codewords that did not match (step 608) and receives the data-block from client 102 (step 610). Note that instead of requesting the data-block, server 110 could have also sent a request to client 102 to break the data-block down into smaller data-blocks and repeat the codeword process to identify smaller sections of data that do not match.

Extensions

This invention can be easily extended in several ways. If client 102 has access to a storage device such as a hard disk, content from media 106 can be copied to the storage device before uploading. This invention can also upload any mass-distributed content such as music files or software application files placed on client 102's storage device by arbitrary means.

Another simple extension is to apply a deterministic content transform before uploading. An audio CD, for example, may first be converted to MP3 format before uploading. Since the size of MP3-encoded content is much smaller than that used for audio CD content, the initial upload time of new content will be significantly reduced.

A further extension is to apply the invention to uploading digital broadcast media. In this case, a broadcast source sends identical content to clients 102 and 104, perhaps by wireless means. If client 102 can store the content, it can be uploaded to server 110. Subsequent content uploads will realize the full speed benefit of this invention. With careful use of buffering techniques, the upload could occur during the original broadcast without requiring that any network device store the entire broadcast.

Theory of Operation

The present invention uses an adaptive-codebook coding algorithm. In codebook coding techniques, a codebook holds a table of codewords that correspond to data sequences. Both the sender and receiver have identical copies of the codebook. On the sender side, an input data sequence is used to find a codeword in the codebook. The codeword is then sent to the receiver. The receiver uses its copy of the codebook and the received codeword to find a matching data sequence in its codebook and the transmission of the data sequence is complete. In an adaptive codebook algorithm, the codebook is augmented or changed when an unknown data sequence is encountered.

In the present invention, data sequences consist of the content of mass-distributed storage media. The codebook starts out empty and a cryptographic hash algorithm is used to generate codewords. If the codeword is not in the sender's codebook, the data sequence is sent to the receiver. The receiver then computes the codeword and stores it and the data sequence in the receiver's codebook. Since the sender can always generate the codeword from the media content, there is no need for a codebook at the sender's side. Once the receiver's codebook has the codeword and data sequence, subsequent transmissions of the same data sequence need only to contain the codeword.

This adaptive codebook technique achieves a very high rate of data compression because each storage media's content, is considered to be one symbol in an alphabet consisting of all the storage media content uploaded so far. According to the principles of information theory first described by Claude Shannon in his 1948 paper entitled "A mathematical theory of communication", the maximum compression for any given data set is limited by the entropy of that data set. In a system with an 8-symbol alphabet, the entropy is 3 bits and thus 3 bits are needed to describe any symbol of the alphabet. In my invention, each symbol represents the entire contents of a given storage media, such as an audio CD. Thus, if the contents of 8 CD's were known to the codebook, only 8 3-bit codewords would be needed to completely describe and upload the CD's content. Textbooks in the field have many examples where symbols represent large bit sequences (though none as large as an entire CD).

The most common and highly studied adaptive codebook compression technique is called Lempel-Ziv (LZ) coding, introduced by Ziv and Lempel in 1977 and followed by many variations. LZ coding finds common sequences in an input data stream, substitutes codewords for these sequences, and updates the sender and receiver's codebooks with these codewords and sequences. LZ coding has been proven to be asymptotically optimal, meaning that given enough time, LZ coding will converge to the entropy of the communicated data. Thus, LZ coding was used on a communication channel and sent the content of 8 CD's over and over again, eventually, only a single 3-bit codeword would be sent across the channel for each CD. If the content of the LZ codebooks could be captured at this time and preloaded before communication started, the coding efficiency would be optimal at the start.

The present invention uses a cryptographic hash of a storage media's contents as the codeword for codebook coding. This method effectively bypasses the codebook building time of LZ coding, but has the disadvantage that the codeword may not be unique for all arbitrary data sequences. However, since The present invention works with mass-distributed storage media content, not arbitrary data sequences, the chance of a non-unique codeword is extremely low.

The present invention's preferred hash algorithm, SHA1, produces a 160-bit hash. This allows for $2^{160}$ possible codewords. If the total number of unique mass-distributed storage media is ten million titles (a high estimate), the 160-bit hash is more than sufficient to uniquely distinguish each title and its possible variations.

Codeword Collisions

As stated above, the hash algorithm provides a means of uniquely identifying a particular data-block from all other data-blocks to be uploaded to server 110. Unfortunately, since the hash algorithm used to generate codwords function is a reduction function, there are cases where two distinct input data sets produce the same codeword. This is called a codeword collision.

In the present invention, the chance of a codeword collision is extremely small because the invention operates on mass-distributed storage media content not arbitrary data. In addition, the scope where a codeword must be unique is reduced because the invention:

a) Compares codewords for data-blocks from storage media content with the same storage media identifier;
b) Compares single codewords to other codewords with the same codeword index; and
c) Incorporates codeword indexes in the hash function used for composite codewords.

This makes the chance of a codeword collision almost negligible.

Should, however, a codeword collision occur, the resulting representation of an uploaded storage media content in database 112 would have entire data-blocks that were out-of-sequence. This is due to the fact that the cryptographic hash function employed to generate codewords has the property that small variations in the input data produce large variation in the resulting hash. Thus, two data-blocks that produced the same hash value are likely to be widely different. If the uploaded storage media content that produced a codeword collision were later downloaded from the server, a human being or machine could easily detect continuity flaws and report this to the server owner.

A second means of codeword collision detection is statistical sampling. At random, client 102 can be instructed to upload an entire storage media data-block even if the data-block's corresponding codeword is found in database 112. The uploaded data-block could then be compared against the corresponding data-block in database 112 with the same codeword. A mismatch between these two data-blocks indicates a codeword collision. Depending on the sampling frequency, this sampling technique can reduce the chance of a codeword collision an arbitrarily low level.

If a codeword collision is detected, the colliding codewords in the server 110's combined codeword and content database 112 should be marked as collided and augmented with a reference to a list of the data-blocks whose codeword is the collided codeword. During upload processing, collided codewords are considered invalid and are not allowed to match a received codeword. A composite codeword generated using a collided codeword is likewise invalid and not allowed to match a received composite codeword. This results in data-blocks for collided codewords being uploaded to server 110 in their entirety. Once received, the uploaded data-blocks are added to the collided codeword list such that they can be later retrieved with normal database operations. This ensures that the invention can continue to operate, albeit somewhat less efficiently, in the presence of codeword collisions.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for uploading content to a server from a client comprising:
   dividing the content into data-blocks of a predetermined size;
   computing a codeword for each data-block to form a set of codewords;
   computing a composite codeword for the set of codewords by computing a function of the set of codewords, wherein the set of codewords and the composite codeword can be computed using a hash function;
   computing a content identifier for the content to differentiate the content from other content;
   sending the composite codeword and the content identifier to the server;
   determining at the server whether the content is available on the server by comparing the composite codeword with composite codewords of previously stored content;
   receiving a response from the server indicating whether or not the content is present on the server; and
   if the content is not present on the server, sending the content to the server.

2. The method of claim 1, further comprising:
   receiving a request from the server to send one or more data-blocks from the content; and
   in response to the request, sending one or more data-blocks to the server.

3. The method of claim 1, further comprising:
   receiving a notification from the server that the codeword did not match the stored codeword on the server for the data-block;
   dividing the data-block into smaller data-blocks of a smaller predetermined size;
   computing a new codeword for each smaller data-block;
   in response to a request from the server, sending the new codewords to the server;
   receiving a request from the server for one or more smaller data-blocks; and
   in response to a request from the server, sending one or more of the smaller data-blocks.

4. The method of claim 1, further comprising sending an account identifier to the server to facilitate identification of the client.

5. The method of claim 1, wherein dividing the content into data-blocks of the predetermined size further involves padding the content with zeros until it is a multiple of the predetermined size.

6. The method of claim 1, wherein prior to dividing the content into data-blocks of the predetermined size, the method further involves saving the content in an alternate format that occupies less physical space than the original format.

7. A method for receiving content at a server from a client comprising:
   receiving a composite codeword and a content identifier for the content at the server, wherein the composite codeword is a function of a set of codewords, and wherein each codeword in the set of codewords is a function of a data-block of the content;
   determining if the content already exists on the server by checking if the content identifier exists in a database of content identifiers;
   if the content exists on the server, determining if the composite codeword matches a stored composite codeword for the content;
   if the composite codeword matches the stored composite codeword, notifying the client that the content is present on the server;
   whereby only one copy of the content is maintained on the server regardless of the number of upload instances of the content; and
   if the content is not present on the server,
      notifying the client that the content is not present on the server,
      receiving the content from the client,
      dividing the content into data-blocks of a predetermined size,
      computing a codeword for each data-block,
      computing the composite codeword for the set of codewords by computing a function of the set of codewords,
      computing the content identifier for the content to differentiate the content from other content, and
      storing the codewords, the composite codeword, and the content identifier in the database.

8. The method of claim 7, wherein the codewords and the composite codeword are computed using a hash function.

9. The method of claim 7, further comprising receiving an account identifier at the server to facilitate identification of the client.

10. The method of claim 7, wherein prior to sending the response to the client indicating the presence of the content, the server uses the codewords and the composite codeword to determine what portions of the content the server has.

11. The method of claim 7, wherein if the composite codeword does not match the stored composite codeword, the method further comprises:

sending a request to the client for the set of codewords;
receiving the set of codewords from the client;
determining if each codeword received from the client is different from the corresponding codeword stored on the server;
sending a request to the client for the data-block that corresponds to the codeword from the client that did not match the corresponding codeword from the server; and
receiving the data-block from the client.

12. The method of claim 11, wherein if the codeword for the data-block does not match the corresponding codeword stored on the server, the method further comprises:

sending a request to the server for one or more data-blocks that correspond to the codewords that did not match; and
in response to the request, receiving one or more data-blocks at the server.

13. The method of claim 11, wherein if the codeword for the data-block does not match the corresponding codeword stored on the server, the method further comprises:

notifying the client that the codeword did not match the stored codeword for the data-block;
dividing the data-block into smaller data-blocks of a predetermined size;
computing a new codeword for each smaller data-block;
sending a request to the client for the set of new codewords;
receiving the set of new codewords from the client;
determining if each new codeword received from the client is different from the corresponding new codeword stored on the server;
sending a request to the client for the smaller data-block that corresponds to the new codeword from the client that did not match the corresponding new codeword from the server; and
receiving the smaller data-block from the client.

14. A computer-readable storage medium storing instructions that when executed by a computer cause the computer to perform a method for uploading content to a server from a client, the method comprising:

dividing the content into data-blocks of a predetermined size;
computing a codeword for each data-block to form a set of codewords;
computing a composite codeword for the set of codewords by computing a function of the set of codewords, wherein the set of codewords and the composite codeword can be computed using a hash function;
computing a content identifier for the content to differentiate the content from other content;
sending the composite codeword and the content identifier to the server;
determining at the server whether the content is available on the server by comparing the composite codeword with composite codewords of previously stored content;
receiving a response from the server indicating whether or not the content is present on the server; and
if the content is not present on the server, sending the content to the server.

15. The computer-readable storage medium of claim 14, wherein the method further comprises:

receiving a request from the server to send one or more data-blocks from the content; and
in response to the request; sending one or more data-blocks to the server.

16. The computer-readable storage medium of claim 14, wherein the method further comprises:

receiving a notification from the server that the codeword did not match the stored codeword on the server for the data-block;
dividing the data-block into smaller data-blocks of a smaller predetermined size;
computing a new codeword for each smaller data-block;
in response to a request from the server, sending the new codewords to the server;
receiving a request from the server for one or more smaller data-blocks; and
in response to a request from the server, sending one or more of the smaller data-blocks.

17. The computer-readable storage medium of claim 14, wherein the method further comprises sending an account identifier to the server to facilitate identification of the client.

18. The computer-readable storage medium of claim 14, wherein dividing the content into data-blocks of the predetermined size further involves padding the content with zeros until it is a multiple of the predetermined size.

19. A computer-readable storage medium storing instructions that when executed by a computer cause the computer to perform a method for receiving content at a server from a client, the method comprising:

receiving a composite codeword and a content identifier for the content at the server, wherein the composite codeword is a function of a set of codewords, and wherein each codeword in the set of codewords is a function of a data-block of the content;
determining if the content already exists on the server by checking if the content identifier exists in a database of content identifiers;
if the content exists on the server, determining if the composite codeword matches a stored composite codeword for the content;
if the composite codeword matches the stored composite codeword, notifying the client that the content is present on the server;
whereby only one copy of the content is maintained on the server regardless of the number of upload instances of the content; and
if the content is not present on the server,
notifying the client that the content is not present on the server,
receiving the content from the client,
dividing the content into data-blocks of a predetermined size,
computing a codeword for each data-block,
computing the composite codeword for the set of codewords by computing a function of the set of codewords,
computing the content identifier for the content to differentiate the content from other content, and
storing the codewords, the composite codeword, and the content identifier in the database.

20. The computer-readable storage medium of claim 19, wherein the codewords and the composite codeword are computed using a hash function.

21. The computer-readable storage medium of claim 19, wherein the method further comprises receiving an account identifier at the server to facilitate identification of the client.

22. The computer-readable storage medium of claim 19, wherein prior to sending the response to the client indicating the presence of the content, the server uses the codewords and the composite codeword to determine what portions of the content the server has.

23. The computer-readable storage medium of claim 19, wherein if the composite codeword does not match the stored composite codeword, the method further comprises:
   sending a request to the client for the set of codewords;
   receiving the set of codewords from the client;
   determining if each codeword received from the client is different from the corresponding codeword stored on the server;
   sending a request to the client for the data-block that corresponds to the codeword from the client that did not match the corresponding codeword from the server; and
   receiving the data-block from the client.

24. The computer-readable storage medium of claim 23, wherein if the codeword for the data-block does not match the corresponding codeword stored on the server, the method further comprises:
   sending a request to the server for one or more data-blocks that correspond to the codewords that did not match; and
   in response to the request, receiving one or more data-blocks at the server.

25. The computer-readable storage medium of claim 23, wherein if the codeword for the data-block does not match the corresponding codeword stored on the server, the method further comprises:
   notifying the client that the codeword did not match the stored codeword for the data-block;
   dividing the data-block into smaller data-blocks of a predetermined size;
   computing a new codeword for each smaller data-block;
   sending a request to the client for the set of new codewords;
   receiving the set of new codewords from the client;
   determining if each new codeword received from the client is different from the corresponding new codeword stored on the server;
   sending a request to the client for the smaller data-block that corresponds to the new codeword from the client that did not match the corresponding new codeword from the server; and
   receiving the smaller data-block from the client.

26. An apparatus for uploading content to a server from a client comprising:
   a dividing mechanism configured to divide the content into data-blocks of a predetermined size;
   a codeword mechanism configured to compute a codeword for each data-block to form a set of codewords;
   a composite codeword mechanism configured to compute a composite codeword for the set of codewords by computing a function of the set of codewords, wherein the set of codewords and the composite codeword can be computed using a hash function;
   a content identifier mechanism configured to compute a content identifier for the content to differentiate the content from other content;
   a sending mechanism configured to send the composite codeword and the content identifier to the server;
   a determining mechanism at the server configured to determine whether the content is available on the server by comparing the composite codeword with composite codewords of previously stored content;
   a receiving mechanism configured to receive a response from the server indicating whether or not the content is present on the server; and
   an uploading mechanism configured to send the content to the server if the content is not present on the server.

27. The apparatus of claim 26, further comprising:
   a secondary receiving mechanism configured to receive a request from the server to send one or more data-blocks from the content; and
   a secondary uploading mechanism configured to send one or more data-blocks to the server in response to the request.

28. The apparatus of claim 26, further comprising:
   a listening mechanism configured to receive a notification from the server that the codeword did not match the stored codeword on the server for the data-block;
   a secondary dividing mechanism configured to divide the data-block into smaller data-blocks of a smaller predetermined size;
   a secondary codeword mechanism configured to compute a new codeword for each smaller data-block;
   a secondary sending mechanism configured to send the set of new codewords to the server in response to a request from the server;
   a secondary receiving mechanism configured to receive a request from the server for one or more smaller data-blocks; and
   a secondary uploading mechanism configured to send one or more of the smaller data-blocks in response to a request from the server.

29. The apparatus of claim 26, further comprising an identifier mechanism configured to send an account identifier to the server to facilitate identification of the client.

30. The apparatus of claim 26, wherein the dividing mechanism is further configured to pad the content with zeros until it is a multiple of the predetermined size.

31. An apparatus for receiving content at a server from a client comprising:
   a receiving mechanism configured to receive a composite codeword and a content identifier for the content at the server, wherein the composite codeword is a function of a set of codewords, and wherein each codeword in the set of codewords is a function of a data-block of the content;
   a determination mechanism configured to determine if the content already exists on the server by checking if the content identifier exists in a database of content identifiers;
   a secondary determination mechanism configured to determine if the composite codeword matches a stored composite codeword for the content if the content exists on the server;
   a notification mechanism configured to notify the client that the content is present on the server if the composite codeword matches the stored composite codeword;
   whereby only one copy of the content is maintained on the server regardless of the number of upload instances of the content;
   a secondary notification mechanism configured to notify the client that the content is not present on the server;
   a secondary receiving mechanism configured to receive the content from the client;
   a secondary dividing mechanism configured to divide the content into data-blocks of a predetermined size;
   a codeword mechanism configured to compute a codeword for each data-block;

a composite codeword mechanism configured to compute the composite codeword for the set of codewords by computing a function of the set of codewords;

a content identifier mechanism configured to compute the content identifier for the content to differentiate the content from other content; and a storage mechanism configured to store the codewords, the composite codeword, and the content identifier in the database.

32. The apparatus of claim 31, wherein the codewords and the composite codeword are computed using a hash function.

33. The apparatus of claim 31, further comprising a receiving mechanism configured to receive an account identifier at the server to facilitate identification of the client.

34. The apparatus of claim 31, further comprising a content analysis mechanism, wherein prior to sending the response to the client indicating the presence of the content, the content analysis mechanism configured to use the codewords and the composite codeword to determine what portions of the content the server has.

35. The apparatus of claim 31, wherein if the composite codeword does not match the stored composite codeword, further comprising:

a sending mechanism configured to send a request to the client for the set of codewords;

a secondary receiving mechanism configured to receive the set of codewords from the client;

an analysis mechanism configured to determine if each codeword received from the client is different from the corresponding codeword stored on the server;

a secondary sending mechanism configured to send a request to the client for the data-block that corresponds to the codeword from the client that did not match the corresponding codeword from the server; and an uploading mechanism configured to receive the data-block from the client.

36. The apparatus of claim 35, wherein if the codeword for the data-block does not match the corresponding codeword stored on the server, further comprising:

a requesting mechanism configured to send a request to the server for one or more data-blocks that correspond to the codewords that did not match; and in response to the request, a secondary uploading mechanism configured to receive one or more data-blocks at the server.

37. The apparatus of claim 35, wherein if the codeword for the data-block does not match the corresponding codeword stored on the server, further comprising:

a secondary notification mechanism configured to notify the client that the codeword did not match the stored codeword for the data-block;

a dividing mechanism configured to divide the data-block into smaller data-blocks of a predetermined size;

a codeword mechanism configured to compute a new codeword for each smaller data-block;

a requesting mechanism configured to send a request to the client for the set of new codewords;

a response mechanism configured to receive the set of new codewords from the client;

a secondary analysis mechanism configured to determine if each new codeword received from the client is different from the corresponding new codeword stored on the server;

a secondary requesting mechanism configured to send a request to the client for the smaller data-block that corresponds to the new codeword from the client that did not match the corresponding new codeword from the server; and a secondary uploading mechanism configured to receive the smaller data-block from the client.

* * * * *